United States Patent [19]

Cameron

[11] Patent Number: 4,957,095

[45] Date of Patent: Sep. 18, 1990

[54] ARCHERY BOW STABILIZER AND EMBEDDED ARROWHEAD REMOVER

[75] Inventor: Ronald D. Cameron, Ann Arbor, Mich.

[73] Assignee: Cougar Archery Products, Ann Arbor, Mich.

[21] Appl. No.: 473,400

[22] Filed: Feb. 1, 1990

[51] Int. Cl.$^{5}$ .......................... F41B 5/00; B23D 19/04

[52] U.S. Cl. .......................................... 124/89; 29/254

[58] Field of Search ................... 124/23 R, 86, 88, 89; 29/254, 275; 273/416, 419

[56] References Cited

U.S. PATENT DOCUMENTS

| | | | |
|---|---|---|---|
| 4,043,020 | 8/1977 | Hoggard | 29/427 |
| 4,150,469 | 4/1979 | Hoggard | 29/254 |
| 4,387,697 | 6/1983 | Duke | 124/89 |
| 4,478,204 | 10/1984 | Kocsan | 124/89 |
| 4,570,608 | 2/1986 | Masterfield | 124/89 |
| 4,584,983 | 4/1986 | Ament | 124/89 |
| 4,615,327 | 10/1986 | Saunders | 124/89 |
| 4,748,965 | 6/1988 | Ament | 124/89 |
| 4,907,567 | 3/1990 | Henrich | 124/89 |

OTHER PUBLICATIONS

"Saunders Noise Busters", Saunders Archery Company, *Bow & Arrow Magazine,* Oct. 1985, p. 19.

"Pro King Hydraulic Stabilizer", Omega Archery Suppliers, *Bow & Arrow Magazine,* Apr. 1986, p. 68.

*Primary Examiner*—Randolph A. Reese

*Assistant Examiner*—Jeffrey L. Thompson

*Attorney, Agent, or Firm*—Harness, Dickey & Pierce

[57] ABSTRACT

A combination archery bow stabilizer and embedded arrowhead extractor having an elongated shaft with an enlarged head at one end and an elongated weight having a central bore extending therethrough in which the shaft is inserted in one direction for use as a stabilizer with the opposite end of the shaft extending from the weight and threaded for mounting in a bow mounting socket. When used as an embedded arrowhead extractor the shaft is reversed in the weight bore. The bore diameter at one end is large enough for the shaft head to slide therethrough to impact against an internal radial shoulder in the weight. The opposite end of the shaft includes a threaded internal bore for coupling to an arrowhead stem whereby reciprocating sliding motion of the weight against the shaft head functions as a slide hammer to remove the embedded arrowhead. A mounting socket in the shaft enlarged head enables additional accessories to be mounted to the bow in series with the stabilizer utilizing a single bow mounting socket.

14 Claims, 1 Drawing Sheet

ARCHERY BOW STABILIZER AND EMBEDDED ARROWHEAD REMOVER

BACKGROUND AND SUMMARY OF THE INVENTION

The present invention relates to an archery bow stabilizer and in particular to a stabilizer that is also useful for removing an arrowhead that has become embedded in a tree, stump or other object.

While bow hunting or during target practice, if the intended target is missed it is possible for the arrowhead to strike a tree, stump, fence post or other object and become embedded therein. An attempt to remove the arrowhead by pulling on the arrowshaft can result in bending of the arrowshaft or the arrowhead such that they are no longer useful. Likewise, an attempt to use a pair of pliers to grip the arrowhead and remove it can also result in damage to the arrowhead rendering it useless.

As a result, several arrowhead extractors have been developed that attach to the mounting stem of the arrowhead after removal of the arrowshaft. Some of these devices function as a slide hammer having an elongated shaft or cable which is attached at one end to the arrowhead stem. A weight or hammer is slidable along the shaft and is impacted against an enlarged end or anvil on the shaft end opposite the arrowhead to apply a force to remove the arrowhead from the object in which it is embedded.

Some of these devices have also been configured for mounting to an archery bow for use as a bow stabilizer. However, the prior art combination devices have suffered from one or more disadvantages. Some devices include a lengthy rod screwed into the stabilizer mounting socket of the bow. A slidable weight is either fixed at the end of the rod or set at various distances from the bow by a set screw to vary the stabilizing effect. A long stabilizer is cumbersome for use while hunting and is thus primarily limited to use during target practice. Combination stabilizer/extractors that are short and thus more convenient for use during hunting, must include other provisions to function as a slide hammer. With a short rod, the weight may be as long as the rod to function as a stabilizer. In order to use it as an extractor, the weight may be divided into two small weights. One weights is then removed to enable the other weight to slide on the rod. Such a device is inconvenient to use in that two separate weights must be handled. Furthermore, the sliding distance is short and the hammer weight relatively small.

Accordingly, it is an object of the present invention to provide a combination bow stabilizer and embedded arrowhead extractor which overcomes the above disadvantages of the prior art devices resulting in a compact and easily used tool.

The stabilizer/extractor of this invention uses a single weight and a shaft approximately the same length as the weight. The shaft extends through a bore in the weight and has an enlarged head or anvil at one end. The anvil is held against the end of the weight by a nut threaded onto the opposite end of the shaft. The shaft extends beyond the nut a sufficient distance to enable the shaft to be mounted into the threaded mounting socket in the bow.

The bore in the weight has an internal shoulder near one end of the weight. When used as an arrowhead extractor the shaft is reversed in the bore. The weight can then slide on the shaft, beyond the anvil head of the shaft until the bore internal shoulder impacts against the anvil. By positioning the shoulder near the end of the weight. A majority of the weight is slidable beyond the end of the shaft increasing the sliding travel of the weight. The shaft end opposite the anvil is equipped with a threaded internal bore to attach to an arrowhead mounting stem. The result is a tool with a single weight of a length approximately equal to the length of the weight.

Further objects, features and advantages of the invention will become apparent from a consideration of the following description and the appended claims when taken in connection with the accompanying drawings.

DETAILED DESCRIPTION OF THE INVENTION

Figure 1:
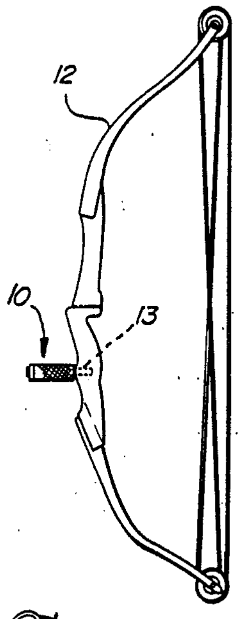
FIG. 1 is an elevational view of an archery bow equipped with the stabilizer/extractor of the present invention.

The combination bow stabilizer and arrowhead extractor of this invention is shown in FIG. 1 and designated generally at 10. Stabilizer/extractor 10 is shown attached to an archery bow 12 in the socket 13 provided for mounting a stabilizer.

Figure 2:
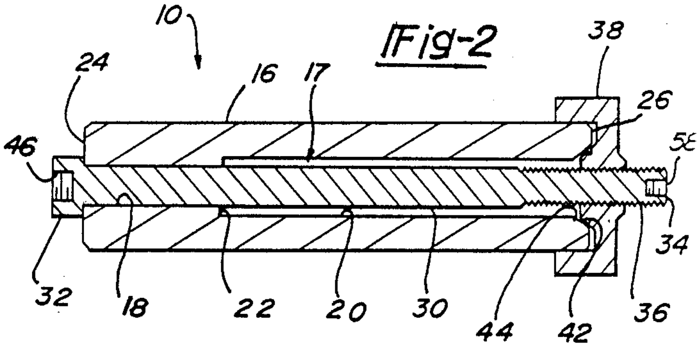
FIG. 2 is a cross-sectional view of the stabilizer/extractor when configured for use as a stabilizer.

With reference to FIG. 2, the stabilizer/extractor is shown in cross-section in the configuration of the tool when used as a stabilizer. The stabilizer/extractor includes a generally cylindrical weight 16 having a longitudinal bore 17 extending axially therethrough. Bore 17 includes a first bore section 18 having one diameter and a second bore section 20 having a diameter larger than the first section 18. At the point where the two bore sections meet one another, a radially extending internal shoulder 22 is formed for a purpose to be described below. The larger diameter bore section is longer than the small diameter section such that shoulder 22 is positioned near the end 24 of the weight.

A shaft 30 extends through the bore and includes an enlarged head 32 at one end. The diameter of bore section 18 is large enough for the shank of shaft 30 to slide through but smaller than enlarged head 32. The bore section 20 is however, large enough for the head 32 to slide through. The shaft 30 is of a length such that when the head 32 is in engagement with the end 24 of weight 16, the opposite shaft end 34 projects slightly beyond the opposite end 26 of the weight. The exterior of shaft 30 at the end 34 includes external threads 36 and functions as the shaft mounting end.

A wing nut 38 of shaft end 34 holds the shaft 30 in a position in which the enlarged head 32 is in firm engagement with the weight end 24. The wing nut includes an o-ring 42 which contacts the beveled surface 44 at the end 26 of the weight to provide a rattle-free coupling. Wing nut 38 can be removed from the shaft by hand, enabling the stabilizer/extractor to be used without the need for tools. The stabilizer/extractor, when configured as shown in FIG. 2 with enlarged head 32 of the shaft adjacent to the weight end 24, is ready for use as a stabilizer. The stabilizer is mounted into the bow socket by screwing the threaded end 34 of the shaft into the stabilizer mounting socket on the bow as shown in FIG. 1. When the wing nut is tightly screwed to the shaft, the stabilizer/extractor can be mounted into the bow socket and tightened by hand.

Figure 3:
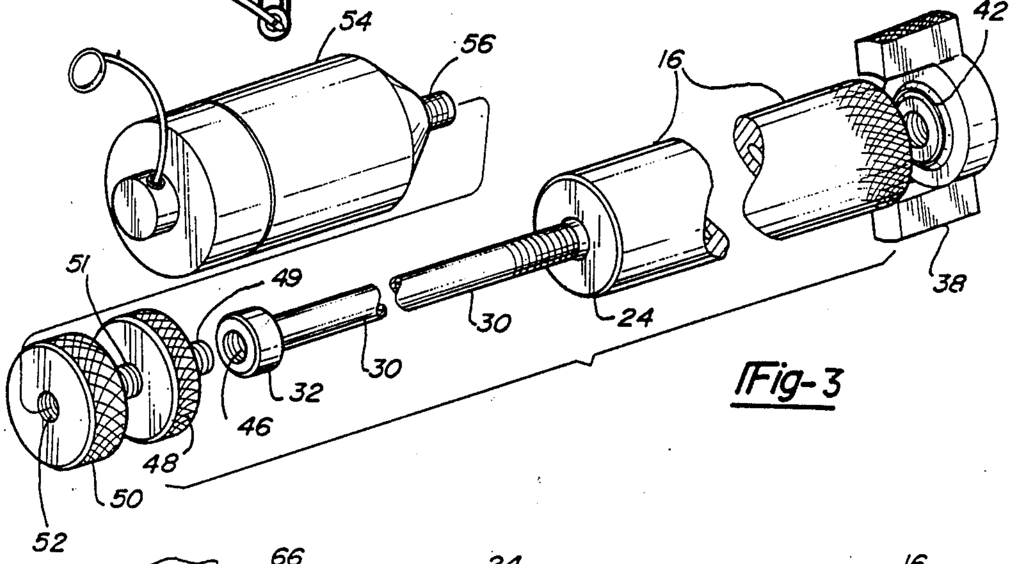
FIG. 3 is an exploded perspective view of the stabilizer/extractor showing accessory items mountable on the stabilizer/extractor.

The enlarged head 32 includes a threaded internal bore 46 that is used to mount optional accessories to the end of the stabilizer/extractor when it is mounted to a bow. For example, two weight disks 48 and 50 each having a threaded stem 49 and 51 respectively are shown in FIG. 3. The face of the disks opposite stems 49 and 51 also includes a threaded bore such as the bore 52 in disk 50. These bores are used to enable attachment of additional accessories in series with the weight disks. The purpose of weight disks 48 and 50 is to enable the user to add weight to the stabilizer in small increments to adjust the total weight of the stabilizer as desired. In addition, a string tracker 54 with a threaded stem 56 can be mounted to either the shaft head 32 or to one of the weight disks. It is advantageous to provide the stabilizer/extractor with the threaded bore 46 to serve as a mounting socket for a string tracker. Bows typically only have one forward mounting socket that can be used either for a stabilizer or a string tracker but cannot accommodate both.

Figure 4:
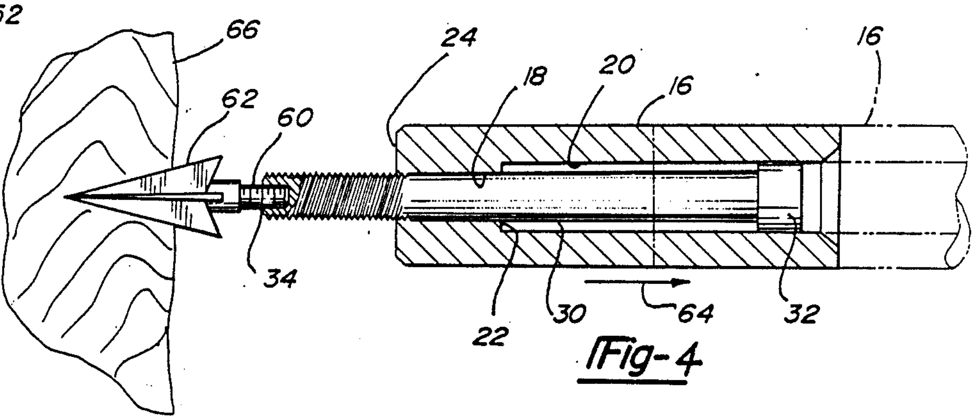
FIG. 4 is a cross-sectional view of the stabilizer/extractor when configured for use in extracting an embedded arrowhead.

To utilize the stabilizer/extractor as an arrowhead extractor, it is removed from the bow and any additional accessories are removed from the shaft head 32. Wing nut 38 is removed, allowing the shaft 30 to be withdrawn from the bore 17. Shaft 30 is reinserted in bore 17 in the opposite direction so that the shaft end 34 projects from the end 24 of weight 16 as shown in FIG. 4. The shaft head slides through the bore section 20 until the head 32 contacts the shoulder 22 near the weight end 24.

A threaded bore 58 in the mounting end 34 of shaft 30 is of a size suitable for threading onto the stem 60 of arrowhead 62. Once the shaft is attached to the arrowhead, the weight 16 can be moved in a reciprocating manner along the shaft 30 impacting internal shoulder 22 against the shaft head 32 when the weight is moved in the direction of arrow 64. The impact of the weight 16 against the enlarged head imparts a force on the arrowhead 62 in the direction to pull the arrowhead from the tree or other object 66 in which it is embedded. Repetitive motion of the weight 16 will eventually extract the arrowhead. The length of the larger bore section is preferably maximized relative to the first bore section to increase the sliding distance of the weight. By placing the shoulder 22 near the weight end 24, the weight, being of a length approximately equal to the length of the shaft, is enabled to slide on the shaft and serve as a slide hammer.

The stabilizer/extractor of the present invention is a compact device extending only a short distance from the bow itself so as to have a minimal effect on the maneuverability of the bow while positioned in a hunting blind or tree stand. Shaft 30 is slightly longer than the weight by a distance sufficient to screw the wing nut onto the shaft and to screw the shaft into the mounting socket in a bow. The weight bore, forming an internal shoulder, enables the shaft to be reversed in the bore and function as a slide hammer with a majority of the weight sliding beyond the enlarged head of the shaft. This results in advantages not found in prior combination stabilizer/extractor tools. It is now possible to slide a weight on a shaft of the same size as the weight. Furthermore, the full weight is available for use as a slide hammer. With the prior two piece weight design, when one weight is removed to enable the other to slide, only a portion of the stabilizer weight is available for use as a slide hammer, reducing the extraction force applied to the arrowhead. A further advantage of the present stabilizer/extractor is the addition of a mounting bore or socket to the end of the stabilizer. This enables accessory items to be mounted to the bow in addition to the stabilizer. This was not previously possible once the forward bow mounting socket was occupied with a stabilizer.

It is to be understood that the invention is not limited to the exact construction illustrated and described above, but that various changes and modifications may be made without departing from the spirit and scope of the invention as defined in the following claims.

I claim:

1. An archery bow stabilizer and embedded arrowhead extractor comprising:

an elongated shaft having an enlarged head at one end thereof;

a weight surrounding said shaft and having a bore extending longitudinally therethrough, said bore having a first portion with a diameter larger than said shaft and smaller than said enlarged head and a second portion with a diameter larger than the enlarged head to enable said head to slide through said second portion, a radial shoulder being formed at the merger of said bore portions;

said shaft having a mounting end opposite from said enlarged head, said mounting end including means for mounting said shaft to said archery bow and means for coupling said mounting end to an arrowhead;

said shaft being positioned in said bore in a first direction with the enlarged head engaging one end of said weight and the mounting end of said shaft projecting from the opposite end of said weight a predetermined distance for mounting said shaft to said bow for use as a bow stabilizer; and said shaft being positioned in said bore in a second direction opposite said first direction with the enlarged head slidable in said bore second portion, said shaft mounting end being coupled to an embedded arrowhead whereby reciprocating motion of said weight impacting said shoulder against said enlarged head removes said arrowhead.

2. The stabilizer/extractor of claim 1 whereby said mounting means comprises external screw threads on said shaft at said mounting end.

3. The stabilizer/extractor of claim 1 further comprising means associated with said shaft mounting end for retaining said shaft in place with said enlarged head engaging said one end of said weight when used as a stabilizer.

4. The stabilizer/extractor of claim 3 wherein said mounting means comprises external screw threads on said shaft at said mounting end and said shaft retaining means includes a nut screwed onto said external threads 5. The stabilizer/extractor of claim 4 wherein said nut is a wing nut to facilitate removal of said nut by hand.

6. The stabilizer/extractor of claim 1 wherein said coupling means includes a threaded bore in the mounting end of said shaft.

7. The stabilizer/extractor of claim further comprising a mounting socket in the enlarged head of said shaft for mounting an accessory device to said stabilizer/extractor when used as a stabilizer.

8. The stabilizer/extractor of claim 7 further comprising at least one weight disk having a stem for mounting in said shaft head socket.

9. The stabilizer/extractor of claim 8 wherein said disk includes a mounting socket opposite said stem to enable a plurality of said disks to be mounted in series on said shaft head.

10. The stabilizer/extractor of claim wherein said second bore portion has a longitudinal length greater than said first bore portion.

11. The stabilizer/extractor of claim 1 further comprising means for mounting an accessory device to said enlarged head when said stabilizer/extractor is being used as a stabilizer.

12. An archery bow stabilizer and embedded arrowhead extractor comprising:

an elongated shaft having an enlarged head at one end thereof, the opposite end having external screw threads and a threaded internal bore;

a weight having a bore extending longitudinally therethrough into which said shaft is inserted, said bore having a first portion with a diameter larger than said shaft and smaller than said enlarged head and a second portion with a diameter larger than said enlarged head to enable said head to slide through said second bore portion, a radial shoulder being formed at the merger of said bore portions;

said shaft being positioned in said bore in a first direction with the enlarged head engaging one end of said weight and with the threaded end of said shaft projecting from the opposite end of said weight a predetermined distance for screwing said shaft into a mounting socket in an archery bow for use as a bow stabilizer; and said shaft being positioned in said bore in a second direction opposite said first direction with the enlarged head slidable in said bore second portion, said shaft threaded bore being coupled to an embedded arrowhead whereby reciprocating motion of said weight impacting said shoulder against said enlarged head removes said arrowhead.

13. The stabilizer/extractor of claim 12 further comprising a nut threadably engaging said external threads to maintain engagement of said head with said weight when said shaft is positioned in said first direction.

14. The stabilizer/extractor of claim 12 wherein said enlarged head forms a mounting socket for mounting an accessory device to said stabilizer/extractor when used as a stabilizer.

* * * * *

UNITED STATES PATENT AND TRADEMARK OFFICE

CERTIFICATE OF CORRECTION

PATENT NO. : 4,957,095

DATED : September 18, 1990

INVENTOR(S) : Ronald D. Cameron

It is certified that error appears in the above-identified patent and that said Letters Patent is hereby corrected as shown below:

Column 5, Claim 7, line 1 after "Claim" insert --1--.

Column 5, Claim 10, line 12, after "Claim" insert --1--.

Signed and Sealed this

Seventh Day of July, 1992

*Attest:*

DOUGLAS B. COMER

*Attesting Officer*

*Acting Commissioner of Patents and Trademarks*